Oct. 16, 1962 J. C. GIBSON 3,059,067

TRANSLATOR-SUPERVISORY APPARATUS FOR TELEPHONE SYSTEMS

Filed April 28, 1958 6 Sheets-Sheet 1

INVENTOR.
JOHN C. GIBSON
BY Kegan, Bellamy & Kegan
ATT'YS.

Oct. 16, 1962 J. C. GIBSON 3,059,067
TRANSLATOR-SUPERVISORY APPARATUS FOR TELEPHONE SYSTEMS
Filed April 28, 1958 6 Sheets-Sheet 2
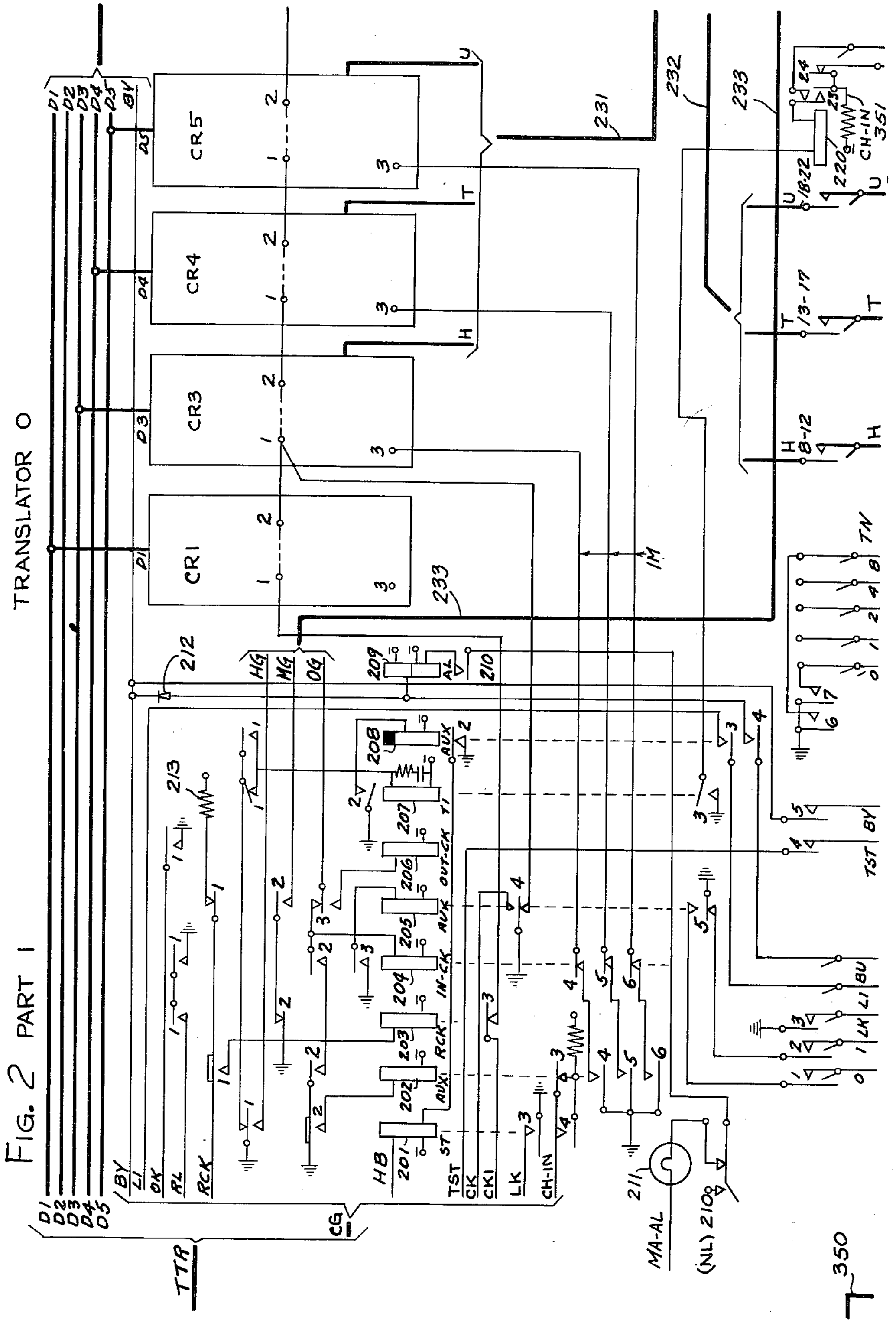
FIG. 2 PART 1

TRANSLATOR-SUPERVISORY APPARATUS FOR TELEPHONE SYSTEMS
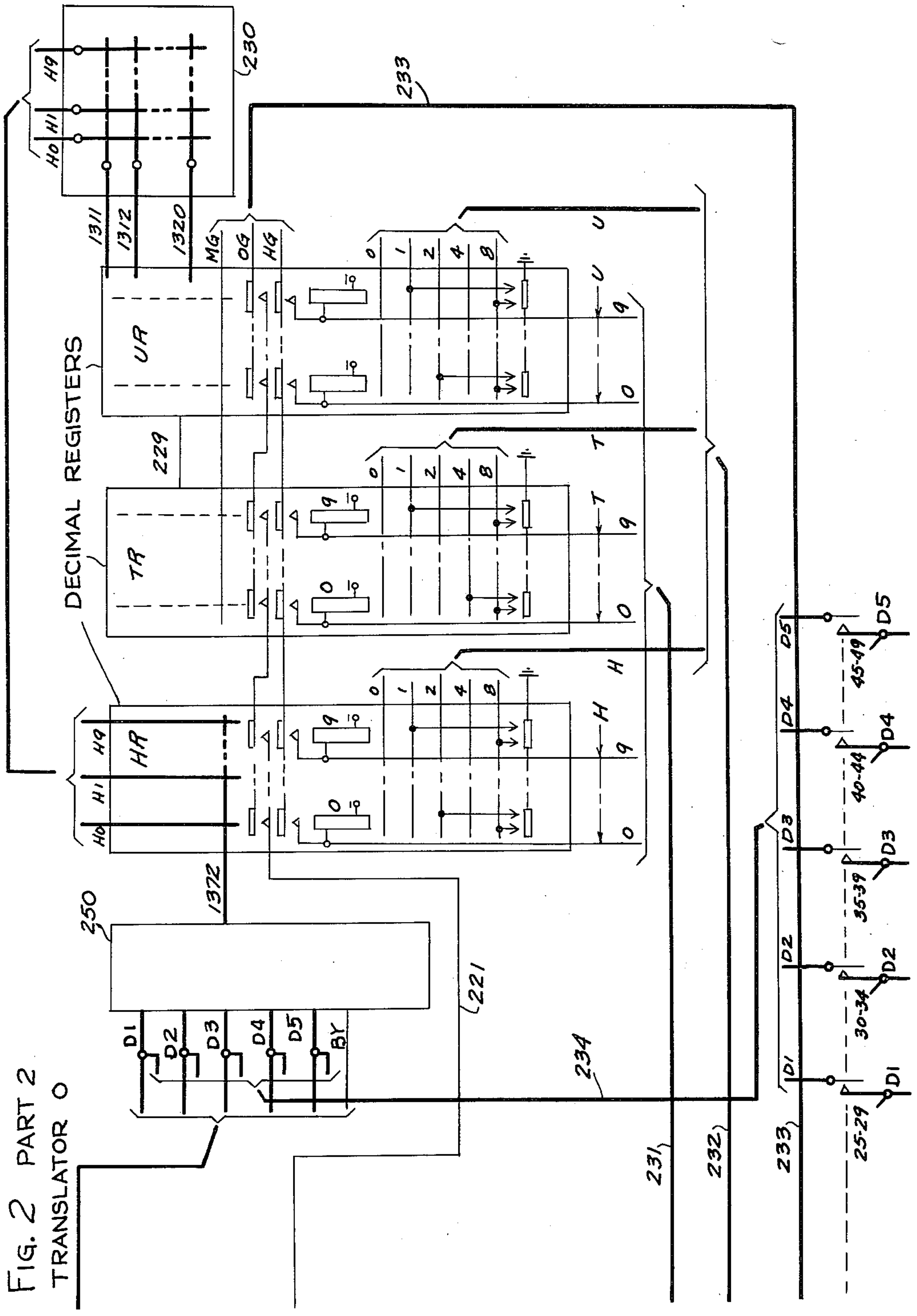
FIG. 2 PART 2 TRANSLATOR O

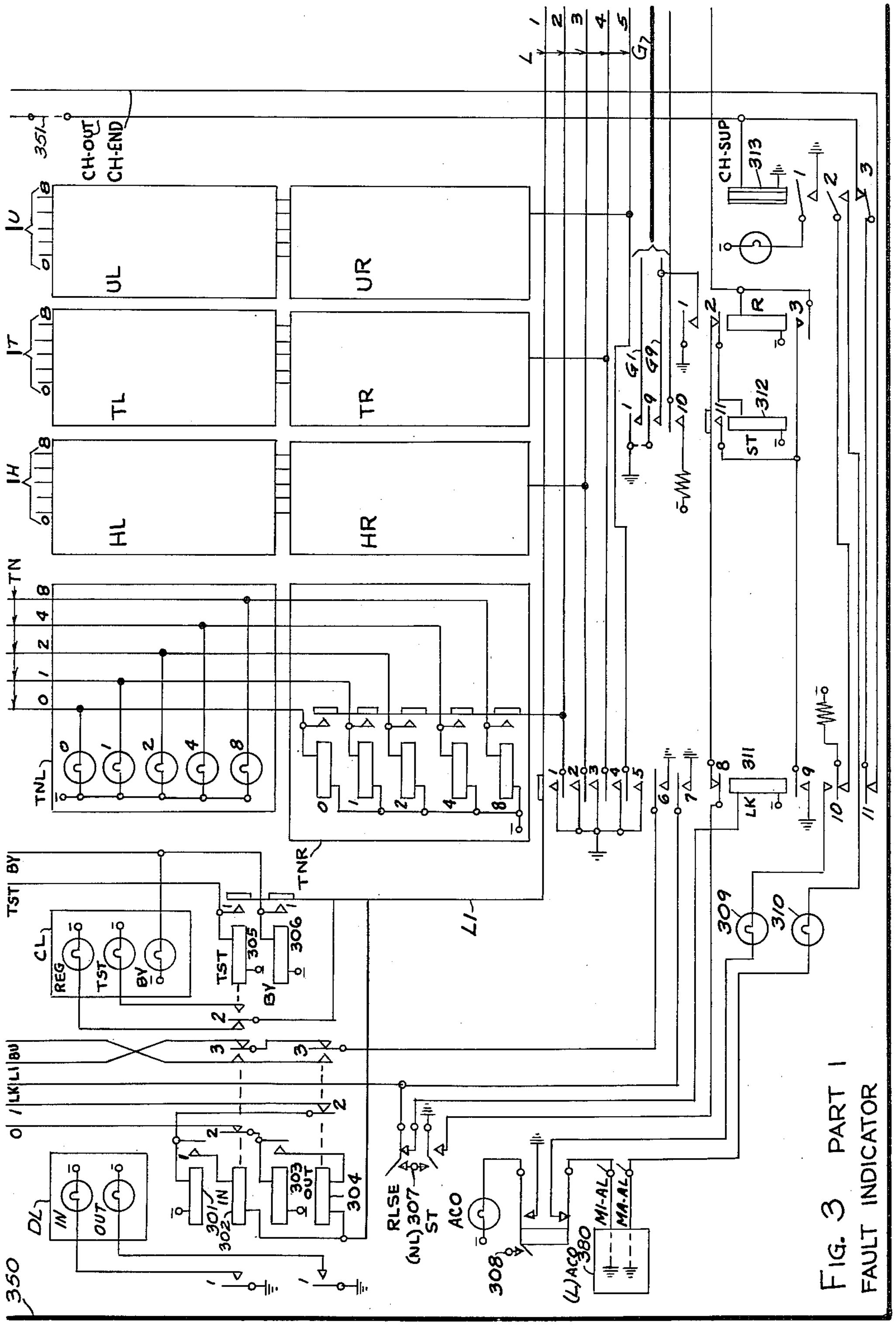
FIG. 3 PART I FAULT INDICATOR

Oct. 16, 1962 J. C. GIBSON 3,059,067
TRANSLATOR-SUPERVISORY APPARATUS FOR TELEPHONE SYSTEMS
Filed April 28, 1958 6 Sheets-Sheet 5
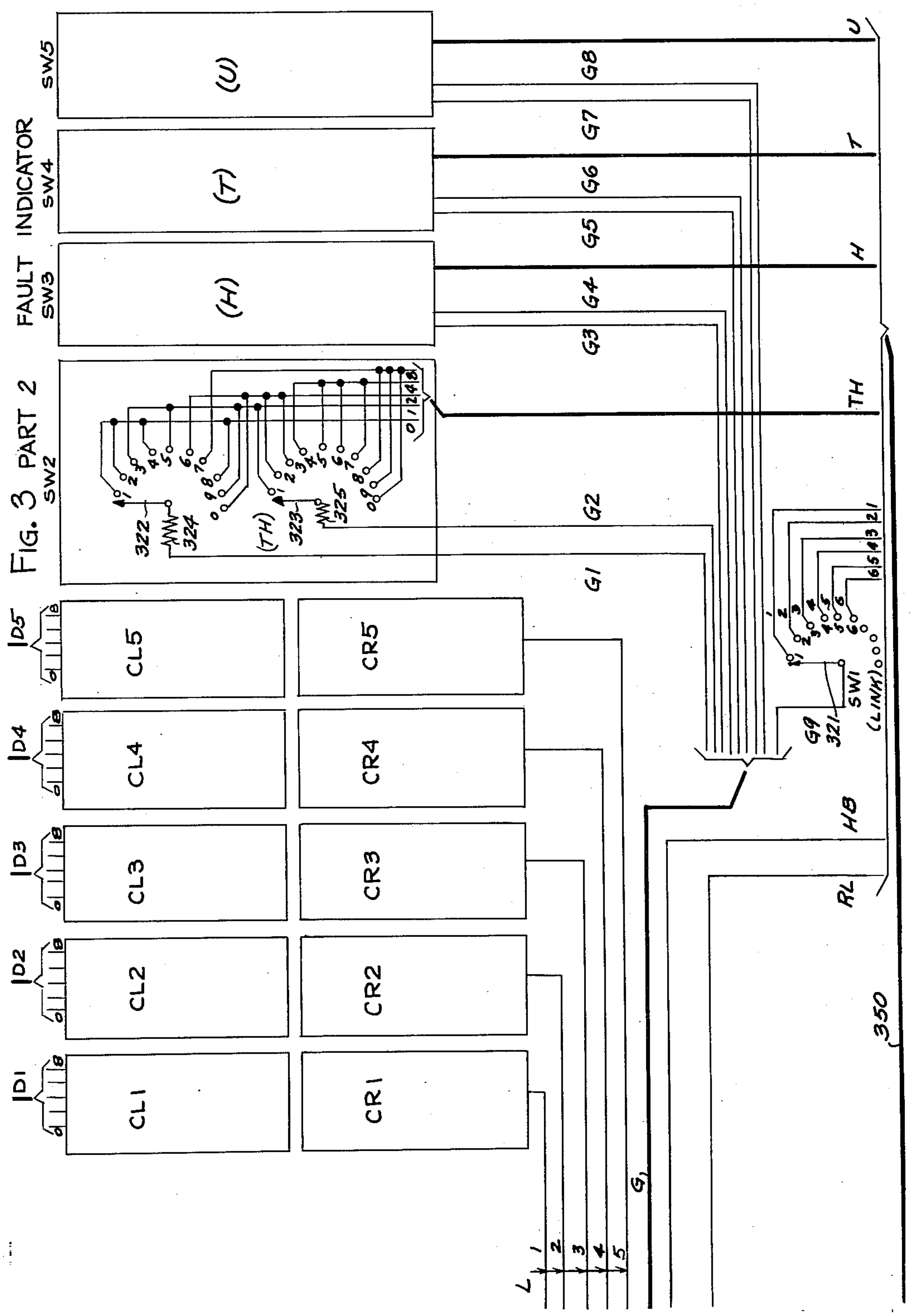
FIG. 3 PART 2

Oct. 16, 1962 J. C. GIBSON 3,059,067

TRANSLATOR-SUPERVISORY APPARATUS FOR TELEPHONE SYSTEMS

Filed April 28, 1958 6 Sheets-Sheet 6

United States Patent Office 3,059,067

Patented Oct. 16, 1962

3,059,067

TRANSLATOR-SUPERVISORY APPARATUS FOR TELEPHONE SYSTEMS

John C. Gibson, Oak Lawn, Ill., assignor to International Telephone and Telegraph Corporation, New York, N.Y., a corporation of Maryland Filed Apr. 28, 1958, Ser. No. 731,483
10 Claims. (Cl. 179—175.23)

Figure 1:
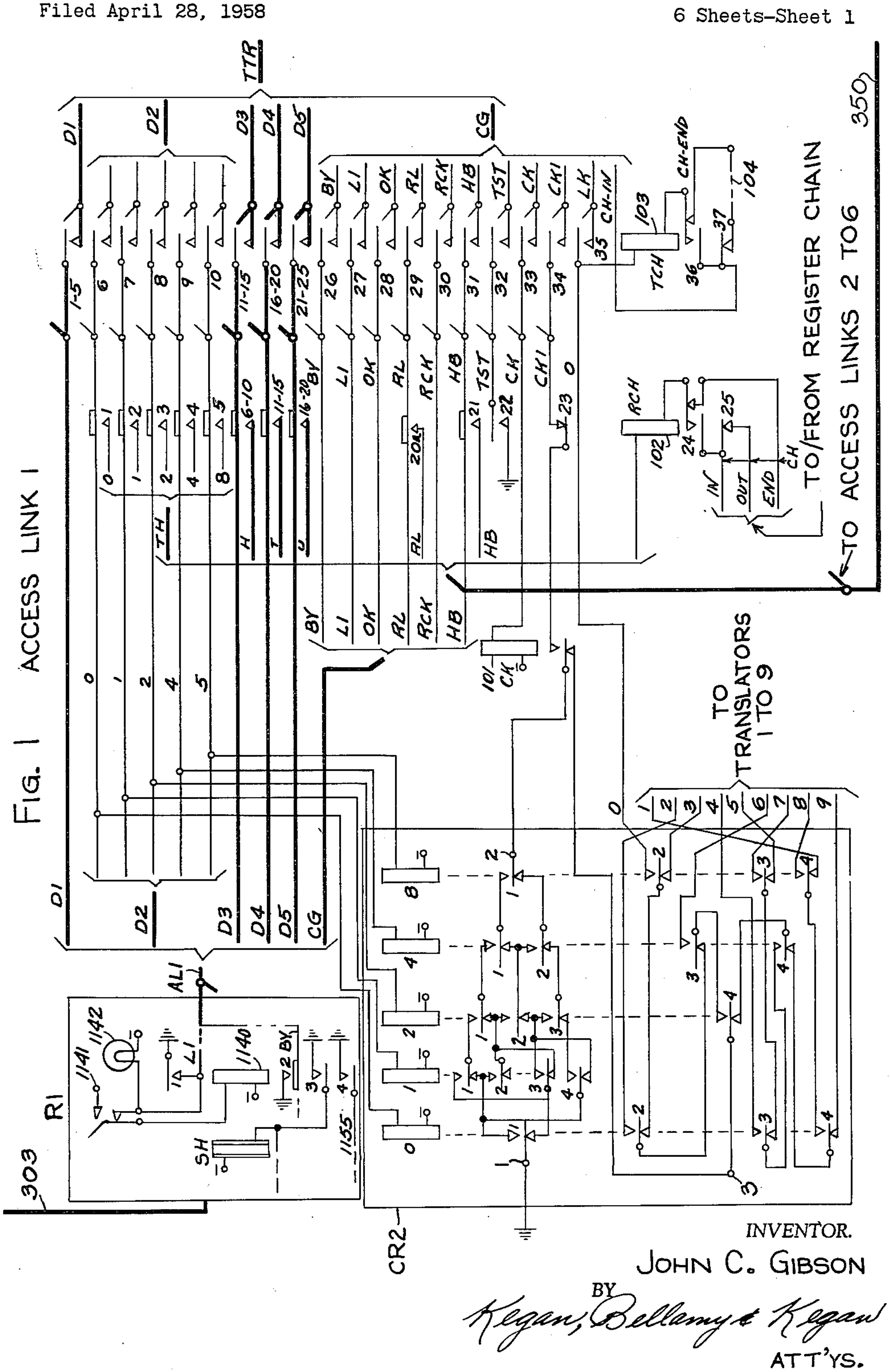

This invention relates to translator-supervisory apparatus for telephone systems, being concerned more particularly with apparatus for supervising the operations of the translator apparatus provided for the common use of registers any one of which may be associated temporarily and individually with a translator to secure the translation of a dialed digit combination registered in the register into a corresponding translated digit combination to be employed by the register in extending the pertaining telephone connection.

A principal object of the invention is to provide reliable and economical apparatus effective when a translator fails to operate normally upon seizure by a register to store a record of the translator condition and of the digit information received from and imparted to the register with which the translator is temporarily associated.

A related object is to provide reliable and economical means for preserving a record of the digit information stored in the register associated with the translator for comparison with the translator record to ascertain the location of the fault causing the translator to fail.

A further object is to provide apparatus for routine use in checking the response of the translator to any selected combination of input digits, which is of particular utility in ascertaining the correctness and efficacy of recent number assignments or translation changes.

A further object is to provide for giving suitable alarm signals in response to abnormal translator operations.

The invention has particular applicability to a system employing registers and translators as disclosed in the application of Edward J. Leonard et al., Serial No. 629,282, filed in the United States Patent Office December 19, 1956, for a Register-Translator Crossbar Telephone System, now Patent No. 2,918,533. There, groups of registers in groups of six are provided in common to trunks over which connections are to be extended, and a register is temporarily attached to any such trunk to receive the call number and to control the switching apparatus in accordance therewith. On locally terminated calls, the arrangement is such that the final four digits of the number require translation before being employed to set up the desired connection. For this purpose a translator is called in temporarily after all digits have been recorded in the register. It receives recorded digits from the register and sends back to the register a translated equivalent thereof. Each translator handles a separate block of 1,000 numbers, and must perform its translating operation very quickly (as within less than half a second) in order that it can handle all calls to the assigned block of 1,000 numbers on a one-at-a-time basis without undue waiting or loss of calls.

In the prior system, both the translator and the register with which it is temporarily associated must execute progress steps, each in cooperation with the other, to complete the translating operation and render the translator available for use with other registers. It has been found that a fault occasionally develops, either in a register or in the translator, which stops the noted progressive action and thus tends to hold the translator and register individually associated indefinitely.

According to the invention, each translator is provided with timing apparatus for terminating the temporary association of the translator with a register when the normal progress of the operation is halted by a fault condition in either the register or the translator, and a fault indicator is temporarily attached to the translator to make appropriate records which are locked therein, and to cause the concerned register to be withdrawn from service with its stored digit information locked therein.

Further, according to the invention, if a second translator failure occurs while the fault indicator contains an uncleared fault record, the noted timing apparatus clears the register and the translator without a record being stored of the digit information available therein, but a major alarm signal is thereupon given to call prompt attention to the translator.

Figure 4:
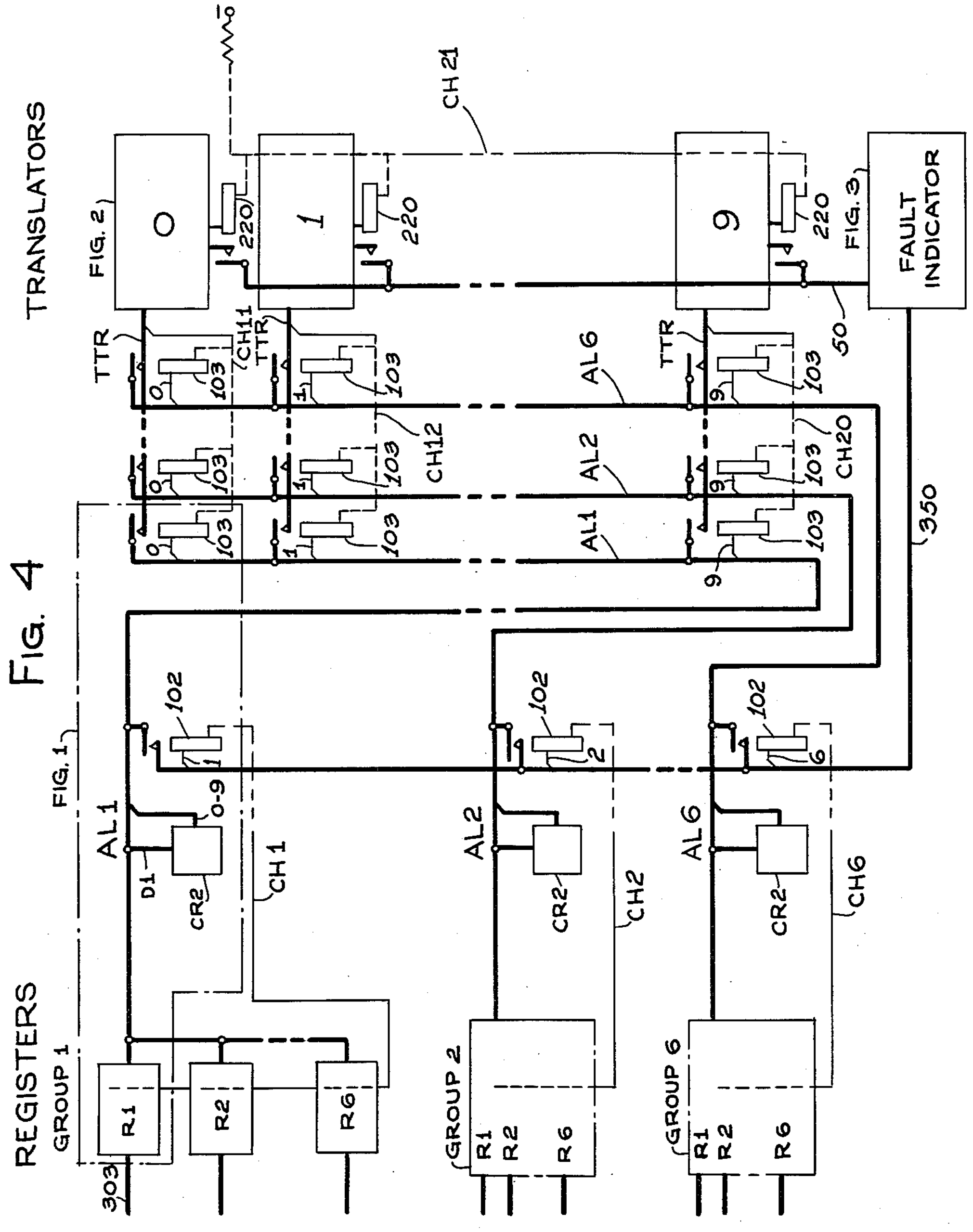

The foregoing and other features and objects of this invention and the manner of attaining them will become more apparent, and the invention itself will be best understood, by reference to the following description of an embodiment of the invention taken in conjunction with the accompanying drawings comprising FIGS. 1 to 3 wherein:

FIG. 1 shows one of the registers of the system and the apparatus of an access link through which that register and others attains access to the translators;

FIG. 2, comprising Parts 1 and 2, shows one of the translators;

FIG. 3, comprising Parts 1 and 2, shows a fault indicator for use with the translator; and FIG. 4 is a block diagram of the fault-indicator system as a whole.

Referring first to FIG. 4, six groups of registers (or register-senders) R are contemplated, of which groups 1, 2, and 6 are indicated. Each such group contains six similar registers R1 to R6, registers R1, R2, and R6 of each group being indicated. Register R1 of group 1 is register R1 of FIG. 1.

Access links AL1 to AL6 are provided for the respective register groups, each such link giving the registers of its group access to the translators shown to the right. The registers of a group are connectable to the associated one of the links AL1 to AL6 one at a time, under the control of the associated one of the usual preference-lockout chains CH1 to CH6.

Each link includes a code register CR2 (FIGS. 1 and 4) settable from the seizing register to select one of the ten translators 0 to 9, and further includes ten relays 103 (FIGS. 1 and 4) operable from CR2 of the link to connect the link to the selected translator subject to the translator being idle, as indicated by the associated one of the ten translator chains CH11 to CH20.

Any of the translators 0 to 9 in which a fault condition develops may operate its relay 220 (FIGS. 1 and 4), subject to the fault indicator being idle as indicated by chain CH21, to seize the fault indicator over conductors 50 to store a record of the fault condition therein.

The fault indicator is further arranged to operate as test apparatus through which any idle translator can be seized and operated by way of any idle one of the links AL1 to AL6. The fault indicator includes attendant-controlled routine test appaartus for setting up a desired test number and for causing any selected one of the six register-chain relays 102 (FIGS. 1 and 4) to operate, subject to the associated access link and its control chain (CH1 to CH6) being idle, to connect the fault indicator to the corresponding access link to cause seizure and control of a selected translator to occur in simulation of its seizure and control by a register R.

Referring now to FIG. 1, register R1 of group 1 of FIG. 4 is shown largely in block-diagram form. It may be similar to the register R1 shown in FIG. 11 of the noted prior application, except for the addition of lock-in relay 1140, signal lamp 1142, and release key 1141.

R1 is accessible to the switching apparatus (not shown herein) over its trunk 303 of FIGS. 1 and 4.

Access link AL1 comprises five code groups of digit conductors D1 to D5 and a control group of conductors CG, to which lock-in conductor L1 has been added to control lock-in relay 1140 of any register R1 which is using access link AL1.

The apparatus of the access link AL1 includes code register CR2, controlled from the second group of eight conductors D2 in the access link, together which check relay 101. Also shown in FIG. 1, is chain relay 102 through which the fault indicator of FIG. 3 may be given temporary control over the access link of FIG. 1 to the exclusion of any of the six associated registers.

The apparatus of FIG. 1 further includes chain relay 103 through which access link AL1 is extentable over translator trunk TTR to translator 0 of FIGS. 2 and 4. Relay 103 of FIG. 2 is interchained in a preference lock-out chain (indicated at CH11, FIG. 4) with similar chain relays 103 (FIG. 4) through which the other access links of FIG. 4 may reach the translator 0 of FIGS. 2 and 4.

The conductors of the access link of FIG. 1 are multipled (as indicated by the illustrated multiple symbols) to the contacts of other relays similar to 103 which are associated with the other nine translators 1 to 9 for a full 10,000-number office or exchange. Each of the conductors 0 to 9 of code register CR2 leads to a relay such as 103 associated with a separate translator.

From the contacts of illustrated relay 103 and its multiples, translator trunk TTR leads to translator 0 of FIG. 2. TTR also comprises five digit groups D1 to D5 and a control group CG.

The translator 0 of FIG. 2 comprises a group of control relays 201 to 209, code registers CR1 and CR3 to CR5, out-mark relays 250, hundreds, tens, and units registers HR, TR, and UR, and detector-field apparatus 230. The translator of FIG. 2 also includes chain relay 220 which can be operated to associate the translator temporarily and individually with the fault indicator of FIG. 3, provided the fault indicator is idle, relay 220 being connected in a preference lock-out chain with similar relays in the other translators.

Code registers CR1 and CR3 to CR5 of FIG. 2 may each be similar to the code register CR2 of FIG. 1; out-mark relays 250 may comprise relays 1 to 25 and BY of FIG. 13, Part 2, of the noted prior application; registers HR, TR, and UR, to the extent not shown herein, may be as shown for the hundreds, tens, and units registers of FIG. 13, Part 2, of the noted prior application; and the detector-field apparatus 350 may be as shown in detail in FIG. 13, Part 3, of the noted prior application.

Referring to FIG. 3, the fault indicator comprises signal-receiving relays 301 to 306 and control relays 311 to 313; direction lamps DL associated with relays 301 to 304; class lamps CL associated with relays 305 and 306; translator-number register TNR for recording the number of the translator from which a locked-in record is taken, together with similar registers HR, TR, and UR for recording the hundreds, tens, and units digits standing in the corresponding registers of the translator; code registers CR1 to CR5, each similar to TNR, for recording the condition of the code groups of conductor D1 to D5 respectively of the translator; and similar display groups of lamps TNL, HL to UL, and CL1 to CL5 associated respectively with the registers of the fault indicator.

The fault indicator further includes control keys and signal lamps 307 to 310, together with switches SW1 to SW5, for selecting an access link such as that shown in FIG. 1 (if idle) to seize a selected translator therethrough (if idle) and to impart a digit combination to the seized translator as a test operation which causes the fault indicator to receive and store a display of the digital response of the translator to the imparted digit information.

A. NORMAL OPERATION

In the normal operation of the system, a register such as R1 of FIG. 1 is seized over its trunk 303 and receives and records digits successively. These digits may comprise an initial digit indicative of a line in the local exchange, followed by thousands, hundreds, tens, and units digits indexing the called telephone station. When this has occurred, the preference-chained access relay of the register R1 (not shown) corresponding to relay TS of FIG. 11, Part 4, of the noted prior application, operates subject to the illustrated access link AL1 of FIG. 1 being idle, seizing that link and locking out the other registers temporarily from using the link AL1. The thousands, hundreds, tens, and units digits stored in the register R1 are thereupon applied in code to the respective conductor groups D2 to D5 of link AL1, the code being a two-out-of-five code according to the following two-five code table.

*Two-Five Code Table*

| Digit | Code Elements | | | | |
|---|---|---|---|---|---|
| 0 | | | 2 | | 8 |
| 1 | 0 | 1 | | | |
| 2 | 0 | | 2 | | |
| 3 | | 1 | 2 | | |
| 4 | 0 | | | 4 | |
| 5 | | 1 | | 4 | |
| 6 | | | 2 | 4 | |
| 7 | | | | 4 | 8 |
| 8 | 0 | | | | 8 |
| 9 | | 1 | | | 8 |

In the above code table, the two code elements for any digit are added together, with one exception, to arrive at the digit value they represent. For example, code elements 2 and 8 represent the digit 0, considered as the number 10; code elements 0 and 1 indicate the digit 1, since their sum is 1; and so on to the digit 9, which is represented by code elements 1 and 8, their sum being 9. The noted exception is the digit 7, which is represented by a combination of the code elements 4 and 8.

When link AL1 is seized by R1 as described, ground is thereby placed on two of the five conductors in each of the digit groups D2 to D5 of AL1 according to the stored thousands, hundreds, tens, and units digit values. Two of the relays 0, 1, 2, 4, and 8 of code register CR2 are thereby operated by ground on the corresponding two of the conductors of digit group D2, thereby setting CR2 according to the thousands digit and selecting the corresponding one of the conductors 0 to 9 associated with CR2. If at least two, but not three, relays of CR2 are operated, the two-five checking contacts of the operated relays of CR2 connect terminals 1 and 2 of CR2 together, thereby extending ground through the back contact of check relay 101 to terminal 3 of CR2, thereby grounding the selected one of the associated digit conductors 0 to 9. If the thousands digit has the value "0," relays 2 and 8 of CR2 are operated, extending the ground on terminal 3 to the associated conductor 0.

If the translator 0 of FIG. 2 is idle, or when it becomes idle, battery potential, through back contact 3 of relay 202 stands on conductor CH–IN of group CG in translator trunk TTR, and extends thence through chain contacts 37 of relay 103 and through similar contacts 104 of the other chain relays (not shown) by which other access links reach the translator of FIG. 2 to reach chain-end conductor CH–END to reach the lower terminal of relay 103, by way of normally closed contacts 36 of 103. Relay 103 thereupon operates from the noted 0–digit ground applied by CR2. It locks itself directly to its associated conductor CH–IN at its contacts 36, at the same time isolating its winding from the associated conductor CH–END; its contacts 37 disconnect battery from conductor CH–END to mark the translator busy to the other access links; and contacts 1 to 35 close the associated conductors of the access link and associated apparatus to trunk TTR and translator 0 of FIG. 2.

In the translator of FIG. 2, code registers CR3 to CR5 are positioned according to the hundreds, tens, and units code signals on the digit groups D3 to D5 of link AL1 and trunk TTR. Code register CR1 may also be positioned according to the preliminary digit employed to index a local 10,000-group of numbers, but the translator does not require input information on register CR1.

Holding battery is now received by the translator from register R1 over hold conductor HB in control group CG of AL1 and TTR, thereby operating start relay 201 through contacts of auxiliary relay 208. Back contact 1 of relay 201 opens the energizing path of normally operated timing relay 207, leaving that relay operated for an interval through the associated holding condenser which is connected in parallel with its winding through the indicated current-limiting resistor. Holding current from the noted condenser maintains relay 207 operated for a sufficient interval (perhaps half a second) to permit all of the normal operations and clearing out of the translator to occur before relay 207 restores. Thus, during normal translator operation relay 207 remains continuously operated.

Front contact 1 of relay 201 grounds holding conductor HG in group 233; its contacts 3 ground locking conductor LK of TTR to maintain relay 103 locked operated after its original operating circuit has been opened; its contacts 4 prepare for the later opening of the associated conductor CH–IN; and its contacts 2 operate the start-auxiliary relay 202. Relay 202 executes certain preparing operations at its contacts 2 to 6. At its contacts 1, it connects release-check relay 203 to release-check conductor RCK of TTR, whereupon relay 203 is operated locally through contacts 1 of relay 205 and battery-supply resistor 213, as a preparatory operation.

Contacts 4 to 6 of relay 203 ground in-marking conductors IM through contacts of relay 204, thereby grounding terminal 3 of registers CR3 to CR5. With CR3 to CR5 set as described, one of the ten relays 0 to 9 (of which only the first and the last relay are shown) is now operated in each of the decimal registers HR, TR, and UR. Each such relay locks itself to ground on conductor HR in group 233, grounded at front contact 1 of relay 201, wherefore registers HR to UR remain set and hold their received hundreds, tens, and units digit information until the translator is cleared out.

With registers CR3 to CR5 and HR to UR set as described, an inward checking chain circuit is established for in-check relay 204 subject to two and not three of the five register relays (see CR2, FIG. 1) being operated in CR3 to CR5, and subject to a relay being operated in each register HR to UR. This check chain is from ground, through back contact 4 of relay 204, terminals 1 and 2 in series in each of the registers CR3 to CR5, conductor 221, contacts of the operated relay in each of the registers HR to UR, conductor OG in group 233, back contact 3 of relay 205, and thence to battery through the winding of in-check relay 204.

Contacts 1 of in-check relay 204 ground release conductor RL in TTR and AL1 through contacts 1 of relay 203 to cause a release of the digit registers (not shown) in register R1 in preparation for a new setting thereof; its contacts 2 close a self-locking circuit through contacts 2 of relay 202; its contacts 3 operate auxiliary relay 205; and its contacts 4 to 6 disconnect ground from in-marking conductors IM.

Register R1 responds to the noted grounding of release conductor RL in TTR and AL1 by clearing its registers, thereby removing digit markings from groups D1 to D5 of AL1 and TTR, clearing out code register CR2 of FIG. 1 and CR1 and CR3 to CR5 of FIG. 2.

When in-check auxiliary relay 205 responds to the described operation of relay 204, its contacts 3 disconnect conductor OG of group 233 from in-check relay 204 and transfers it to out-check relay 206, which cannot respond until the registers have been reset and relay 203 has restored; and its contacts 4 open the in-check chain and ground CK of TTR to operate check relay 101.

Contacts 1 of relay 205 disconnect battery locally from release-check conductor RCK, leaving relay 203 operated over conductor RCK of TTR and AL1 until the digit registers (not shown) of R1 have cleared out responsive to operations as noted above. These registers are of the locking-relay type and the common locking path of the locking relays is transferred in R1 to conductor RCK as disclosed in the noted prior application. Relay 203 is of sufficiently high resistance that no one of the locking register relays of R1 will remain operated in series with it, but relay 203 will remain operated in series with any one of them until all of the locking register relays have restored, thereby removing battery at R1 from conductor RCK. Relay 203 thereupon restores ungrounding conductor RL to permit resetting of the registers in R1.

With release-check relay 203 restored, and in-check auxiliary relay 205 operated, ground is applied to master ground conductor MG of group 233, which establishes a circuit path through a contact pair (not shown herein) of tens register TR, a conductor in group 229, a contact pair (not shown herein) of register UR, one of the conductors in groups 1311 to 1320 of the noted prior application, rectifier crosspoints (not shown herein), in detector-field 230, certain conductors in one of the groups H0 to H9, contacts (not shown herein) of the operated one of the ten relays in register HR, corresponding conductors in group 1372, to operate the corresponding relays (not shown herein) in out-marking group 250. Accordingly, unless the called number is unassigned (in which case conductor BY of TTR and AL1 is grounded at 230), two of the five conductors in each of the associated digit groups D1 to D5 is grounded at 250 to reposition the register relays of register R1 in accordance with thousands, hundreds, tens, units, and stations digits comprising the translated equivalent of the thousands, hundreds, tens, and units digits employed to select and position the translator.

For checking purposes, the relays of code registers CR1 to CR5 of FIGS. 2 and 1 are positioned along with the noted registering apparatus of register R1 of FIG. 1. A two-out-of-five code check is thus made through the noted registers in series. If at least two relays, and less than three relays, are energized in each of the noted registers of FIGS. 1 and 2, out-check relay 206 is now operated over the following circuit path: from ground at terminal 1 of register CR2, through front contacts of the two operated ones of the relays 0 to 8 of that register to terminal 2 thereof, front contact of relay 101, contacts 23 and 34 of relays 102 and 103, conductor CK1 of TTR, contacts 2 of the now restored relay 203, terminals 1 and 2 in series of registers CR1 and CR3 to CR5, contacts in each of the registers HR to UR, conductor OG of 233, front contact 3 of relay 205, and to battery through the winding of out-check relay 206.

Relay 206 grounds the associated conductor OK, to place an out-marking condition on registers R1, which thereupon frees access link AL1, removing holding battery from conductor HB of AL1 and TTR to restore start relay 201 of the translator. Relays 103, 202 and 204 to 206 responsively restore, clearing out relay apparatus 250 and registers CR1 to CR5 and HR to TR. During the slight interval required for relay 202 to restore after relay 201 restores, battery is withheld from CH–IN of TTR, providing a slight clearout interval before a relay 103 of another access link can seize the translator. This interval, plus that required for a relay 103 to operate, is sufficient for the timing condenser of the still-operated relay 207 to recharge through its illustrated resistor.

B. FAULT OPERATION

If a fault develops which prevents a seized translator from executing its described series of operations which culminate in its being freed and cleared out as described, timing relay 207 restores and operates slow-operating relay 208 to cause a forced clearout of the translator, preceded by a momentary seizure of the fault indicator of FIG. 3, if idle.

IN-CHECK FAILURE

If the noted fault has prevented closure of the described in-check circuit, in-check relay 204 is still restored when relay 207 restores, leaving the translator in condition to mark an in-check failure in the fault indicator.

Contacts 3 of the restored relay 207 ground one terminal of relay 220, through which the fault indicator of FIG. 3 is seized by translator 0. If the fault indicator is idle, chain relay 220 now operates from ground through contacts 3 of the restored timing relay 207, winding of relay 220, normally closed contacts 23 of 220, the associated chain-end conductor CH–END, contacts 11 of relay 311, contacts 3 of the normally operated chain-supervisory relay 313, chain contacts of other translators, indicated at dotted section 351, and thence through chain contacts 24 of relay 220 and the associated resistor to battery. Upon operating, relay 220 locks itself to the associated conductor CH–IN at its contacts 23, at the same time disconnecting its winding from the multipled chain-end conductor CH–END. Its contacts 24 open the preference chain to the other translators, open-circuiting chain-supervisory relay 313 which is slow-restoring so as to remain operated during the comparatively brief time when a relay such as 220 is permitted to remain operated.

At its contacts 1 to 5, relay 220 connects the associated conductors of the fault indicator to the corresponding conductors of the translator. At its contacts 6 and 7, it grounds the illustrated strap conductors which are connected to code conductors 0 and 8 in the multipled translator-number group TN to signal that translator 0 is the one which has seized the fault indicator. A different straping of contacts 6 and 7 is employed at each of the other translators according to the translator numbers expressed in the code given in the foregoing two-five code table.

Contacts 8 to 22 of relay 220 connect the respective conductors of code groups H, T and U of the translator to the corresponding conductors of the fault indicator to provide a record in the fault indicator of the current setting of registers HR, TR, and UR of the translator. The lowermost contact set of the relays in these registers is arranged to apply marking ground in the two-five code to the associated signal conductors 0 to 8.

Contacts 25 to 49 of relay 220 connect the conductors in digit groups D1 to D5 of TTR individually to the corresponding conductors of the fault indicator to provide a record of the markings existing on digit groups D1 to D5 during the temporary association between the translator and the fault indicator.

In the fault indicator, the grounding of conductor LK at contacts 3 of relay 220 closes a circuit through the release contacts of key 307 for lock relay 311. Relay 311 locks itself operated at its contacts 7 until released by key 307. Contacts 1 to 5 of 311 ground locking conductors L1 to L5.

With in-check relay 205 restored, ground through back contact 5 thereof and through contacts 2 of relay 220 closes a circuit through contacts 2 of relay 304 for IN relay 301, which operates as a signal that the in-checking operation of the translator has failed to occur. Relay 301 locks through its own contacts and the winding of relay 302 to ground on conductor L1, but relay 302 remains unoperated as long as ground is maintained on the associated IN conductor I.

Subject to there being a marking ground on busy conductor BY of TTR, a circuit is closed through contacts 5 of relay 220 to light busy lamp BY of class group CL and to operate busy relay 306, which (when so operated) locks to conductor L1 to maintain lamp BY of CL lit after relay 220 has restored.

Responsive to the grounding of conductors 0 to 8 in translator-number group TN, display lamps 0 and 8 are lighted in TNL, and relays 0 and 8 in the associated translator - number register TNR are operated. They lock to conductor L2 to maintain the associated lamps 0 and 8 of TNL lighted to identify the translator 0 after relay 220 has restored. Each of the remaining registers HR to UR and CR1 to CR5 are each similar to TNR with the result that they record the code signals present in the translator 0 over the associated conductor groups H to U and D1 to D5. The relays in these latter registers lock to the associated illustrated ones of the locking conductors L1 to L5, thereby maintaining their record after relay 220 has restored. The lamp groups HL to UL and CL1 to CL5 are each similar to the lamp group TNL, thereby supplying a lamp indication for each of their associated registers as is illustrated for TNL and the register TNR.

Front contact 10 of relay 311 closes a circuit through the minor-alarm signal lamp 309, and through contacts of alarm-cutoff key 308 to the minor-alarm conductor MI–AL, causing alarm apparatus 380 to signal a minor alarm and causing lamp 309 to become lighted to indicate that the minor alarm originates at the seized and locked fault indicator. An attendant is accordingly expected to act upon the fault displayed in the fault indicator.

After perhaps fifty milliseconds, slow-operating auxiliary relay 208 responds to the described restoration of timing relay 207. With IN and OUT fault-indicator relays 302 and 304 both restored, and with relay 311 operated, as described, there is ground on lock-in conductor L1 of the fault indicator, which is extended through contacts 3 of the relay 208 to lock-in conductor L1 of TTR and of AL1, to reach conductor L1 of register R1. Lock-in relay 1140 of R1 now operates through contacts of key 1141. It locks operated at its contacts 1 until released by key 1141; grounds the associated busy conductor BY at its contacts 2; operates relay SH at its contacts 3; and grounds conductor 1155 at its contacts 4. Lamp 1142 is lighted as a lock-in signal at R1.

As disclosed in the noted prior application, the described grounding of conductor BY at contacts 2 of relay 1140 causes R1 to free link AL1, and causes a signal to be transmitted over a conductor of trunk 303 as an indication to the calling subscriber that the number called cannot be obtained for the moment, in addition to causing the connection to R1 over trunk 303 to be cleared; the described operation of relay SH marks the register R1 busy at its associated allotter; and the described grounding of conductor 1155 establishes a holding circuit for maintaining the noted individual registers of R1 (not shown herein) in locked condition for later inspection for a recording fault in register R1 which may have caused the translator of FIG. 2 to fail as described.

The noted grounding of conductor BY by contacts 2 of relay 1140 also causes the busy relay BY (not shown) of register R1 to operate to secure the freeing of access link AL1 by R1.

In the translator of FIG. 2, contacts 2 of relay 208 open-circuit and restore start relay 201, and contacts 1 of 208 reconnect timing relay 207 to the back contact of relay 201. Responsive to the restoration of relay 201 any operated ones of the relays 202 to 206 restore and timing relay 207 reoperates. A moment later, auxiliary relay 208 restores to reconnect start relay 201 and to leave timing relay 207 locked operated.

Upon the described reoperation of timer relay 207, relay 220 restores to terminate the individual association between the translator of FIG. 2 and the fault indicator of FIG. 3. Chain contacts 24 of relay 220 reclose the preference lock-out chain of the relays similar to 220 in the several translators, reenergizing relay 313 before it has had time to restore, but operating potential is withheld from the associated conductor CH–END by contacts 11 of relay 311, maintaining the fault indicator marked busy to the translators.

Upon the described restoration of relay 220, contacts 2 thereof remove ground from IN conductor I, opening the initial operating circuit of relay 301. Relay 301 remains locked operated and relay 302 operates in the locking circuit of relay 301. Contacts 1 of relay 302 light lamp IN of direction group DL as a signal that the incoming checking operation of the translator failed; contacts 2 of relay 302 disconnect outgoing relay 303; and contacts 3 of relay 302 disconnect ground from lock-in conductor L1 and transfer it to busy conductor BU.

SUCCEEDING FAULT OCCURRENCES

As long as relay 311 of the fault indicator remains locked operated, the signal setting received from the translator of FIG. 2 is maintained, and the operating path of relays 220 of the several translators is maintained open, preventing further seizure of the fault indicator. If, during this interval, translator 0 (for example) fails to clear out until its timing relay 207 restores, its relay 220 cannot be responsively operated because of the open condition of the operating chain. Also, upon operation of the associated auxiliary relay 208 there is no ground on conductor L1 of the fault indicator, wherefore conductor L1 of TTR and of AL1 cannot be grounded to cause lock-in relay 1140 of the calling register to operate. Instead, with relay 302 operated (and the same is true if relay 304 stands operated) ground potential stands on busy conductor BU of the fault indicator, closing a circuit through contacts 4 of the operated relay 208 for the upper winding of alarm relay 209. A branch of this circuit extends through isolating rectifier 212 to busy conductor BY of TTR and AL1, causing the register in use (similar to R1) to return a busy signal to the calling line and to free itself and the access link in use, to thereby free the translator, but without operation of lock-in relay 1140 of the register.

Alarm relay 209 closes a self-locking circuit through its lower winding, contacts of alarm-release key 210, major-alarm signal lamp 211, and thence over major-alarm conductor MA–AL (also shown in FIG. 3) to cause apparatus such as 380 to sound a major alarm and causing lamp 211 to light as a signal that the major alarm is coming from the translator 0 of FIG. 2. Translator 0, nevertheless, clears out as described, responsive to the operation of relay 208.

It is clear from the foregoing that a single and isolated failure of a translator to operate properly is treated as a minor alarm upon the seizure of the fault indicator as described and the described closure of a minor alarm circuit through lamp 309, while the same condition arising on the same or another translator while the previous fault indication is being held in the apparatus of FIG. 3 causes a major alarm to be sounded.

When desired, the major alarm condition at the translator may be released by the momentary operation of key 310, extinguishing lamp 211 and restoring relay 209.

When the attendant observes the active minor-alarm condition of the fault indicator, by observing the lighted condition of alarm lamp 309, or perhaps of a lamp in group DL or CL, he may operate the locking alarm-cutoff key 308 to light the alarm-cutoff lamp ACO and to extinguish lamp 309 and open its alarm circuit over conductor MI–AL as an indication to the other attendants that the minor alarm in question has been responded to.

The lighted condition of lamp IN in group DL (relays 301 and 302 operated) notifies the attendant that the lamp signals at CL1 to CL5 are signals over digit groups D1 to D5 of the translator from the register as distinct from outgoing signals in the reverse direction; the lighting of regular lamp REG in group CL (from ground on L1 through back contact 2 of 305) indicates a fault display from regular operation as distinct from test operation to be later described; and the lighting of lamps in group TNL indicates in code which of the translators recorded the information locked in at the fault indicator.

CLEARING THE FAULT INDICATOR

Upon observing the lamp display at the fault indicator, the attendant may proceed directly and immediately to examine the translator whose number is recorded at TNL to ascertain whether there is an apparent fault condition therein, or may proceed to the locked-out register R1 for the same purpose, or he may make a record of the lighted condition of the lamps at DL, CL, TNL, HL to UL, and CL1 to CL5, and clear the fault indicator for use by any of the translators, particularly if a described succeeding fault has brought in a major alarm.

The locked condition of the fault indicator is terminated by a momentary actuation of the non-locking key 307 to release position, thereby unlocking and restoring relay 311. Contacts 1 to 5 of 311 remove ground from conductors L1 to L5 to restore the associated locked relays and to extinguish the display lamps. Restoration of key 308 extinguishes lamp ACO.

The closure of contacts 11 of relay 311 again energizes the associated conductor CH–END to permit relay 220 of any translator to operate to seize the fault indicator and make a described recording of translator conditions therein.

OUT-CHECK FAILURE

When relay 220 is operated to seize the fault indicator with in-check auxiliary relay 205 operated by in-check relay 204, ground does not appear on IN conductor I of the fault indicator, but appears on OUT conductor 0 thereof as an indication of an out-marking failure in the translator, which is a failure of out-check relay 206 to operate following the operation of relay 205. Accordingly, relay 303 is operated in the fault indicator in place of 301, followed by the operation of relay 304 when seizing relay 220 restores. As a consequence, lamp OUT of DL is lighted in place of lamp IN thereof. The attendant at the fault indicator is thereby informed that any lamp indications at CL1 to CL5 now locked in the fault indicator by CR1 to CR5 are out-marking indications from out-marking relays 250 of the translator as distinct from indications from the seizing register.

As described, the locked condition of the fault indicator is cleared upon operation of key 307 momentarily to release position.

TEST USE OF FAULT INDICATOR

The fault indicator may be used to test any desired one of the translators, by way of any one of the six access links, of which AL1 is shown in FIG. 1, either as a test of a translator which previously caused a display on the fault indicator or a test of a translator at which changes have been recently made within the detector field 230 to effect new or changed number assignments. For this purpose, arm 231 of link switch SW1 is set upon the one of its contacts 1 to 6 which corresponds to the access link desired to be used; brushes 322 and 323 of thousands switch SW2 are set on their contacts 1 to 0 corresponding to the translator to be tested, and the hundreds, tens, and units switches SW3, SW4, and SW5 (not shown; each similar to SW2) are positioned according to the hundreds, tens, and units digit settings to be employed in the translator to be tested; following which non-locking key 307 is momentarily actuated to start position, thereby momentarily closing its lowers contact pair to complete a circuit through contacts 8 of relay 311 for start relay 312. Contacts 11 of relay 312 close a self-locking circuit to ground through contacts 9 of relay 311; contacts 10 of 312 apply battery to conductor HB of group 350; and contacts 1 to 9 of 312 ground the respective conductors G1 to G9, thereby individually grounding brush 321 of switch SW1, brushes 322 and 323 of switch SW2, and the corresponding brushes of each of the switches SW3 to SW5, thereby applying digit signals according to the noted two-five code to the conductors in groups TH, H, T, and U of group 350.

If brush 321 of SW1 is set on its first contact, the grounding of conductor G9 grounds conductor 1 of group 350, which extends to one winding terminal of register-chain relay 102, thereby selecting the access link of FIG. 1 and causing chain relay 102 to be operated in the chain circuit of the register group which includes register R1 of FIG. 1, subject to access link AL1 being momentarily idle. Upon operating, relay 102, at its contacts 24 locks itself into the associated chain conductor IN; opens the register chain at its contacts 25 to busy the access link to the six associated registers such as R1; its contacts 1 to 21 connect the conductors in groups TH, H, T, and U and conductors RL and HB of 350 respectively to the corresponding conductors of link AL1; its contacts 22, relay 102 grounds conductor TST of the access link to indicate a test call at the translator to be seized; and its contacts 23 open conductor CK1 in the access link to insure seizure of the fault indicator.

If switch SW2 has been positioned with brushes 322 and 323 on their 0 contacts, conductors 2 and 8 in group TH of 350 are groundel, thereby grounding conductors 2 and 8 of digit group D2 of the access link. Relays 2 and 8 of register CR2 of FIG. 1 are thereby operated to select and ground the associated wire 0 leading to relay 103, thereby selecting and seizing transmitter 0 of FIG. 2 as described.

Upon the ensuing operation of relay 103, registers CR3 to CR5 position themselves according to the setting of SW3 to SW5 of FIG. 3, and registers HR, TR and UR are positioned accordingly in preparation for setting the out-marking relays 250 according to the 5-digit translated number represented by the 4-digit setting of switches SW2 to SW5.

Relays 201 to 205 are expected to operate as described, but out-check relay 206 cannot operate because contact 23 of relay 102 is open and thus holds open its described circuit.

When relay 204 grounds release conductor RL, of TTR, a circuit is closed thereover for release relay R of the fault indicator. At its contacts 3, relay R locks itself through contacts 9 to 311; its contacts 1 further ground conductor G9 to hold relay 102 operated after 313 restores; and its contacts 2 restore start relay 312 to remove IN marking from the code digit conductors. Relay 203 restores when contacts 1 of 205 opened as described.

With out-check relay 206 being prevented from operating as described, the clearing-out operation of the translator is delayed for a sufficient length of time to permit relay 207 to restore as described. If the fault indicator is idle, as it is unless another translator has seized it, relay 220 responsively operates as described, seizing the fault indicator from the translator of FIG. 2.

OUT relay 303 is thereupon operated along with relays in TNR to UR and CR1 to CR5, lighting lamps in TNL to UL and CL1 to CL5 as described. Ground through contacts 22 and 32 of relays 102 and 103 reaches conductor TST of TTR, and extends thence through contacts 4 of relay 220 to operate test relay 305 of the fault indicator, which locks to conductor L1 and contacts 1 of relay 311, operated as described through contacts 3 to 220. Test lamp TST of CL is accordingly lighted in place of regular lamp REG, indicating to the attendant at the fault indicator that the fault-indicator display is the test display which he seeks.

Contacts 9 of relay 311 unlock and restore release relay R which ungrounds conductor G9 to release relay 102 to free the access link.

The rather fleeting individualization of the translator with the fault indicator is terminated as described when relay 208 responds to the operation of relay 207 and starts the control relays of the translator to clear out, beginning with the restoration of relay 201, and followed by the reoperation of relay 207 and the restoration of relay 208. When relay 220 responsively restores, OUT relay 304 operates and lights lamp OUT to group DL to indicate an out-checking failure.

When the attendant has observed (and has recorded, if desired) the lamp-displayed information locked in the fault indicator, he may clear the fault indicator by momentarily actuating relay 307 to its release position to unlock and restore relay 311 and the other locked relays, freeing the fault indicator for further use as described.

If the attendant at the fault indicator desires to repeat the test procedure for which switches SW1 to SW5 are set, it suffices to again operate key 307 momentarily to start position after having operated it momentarily to release position as described, again operating start relay 312 with the previously described results.

If a test of the access links is desired, the test operations may be repeated successively, advancing arm 321 of SW1 to a new access-link position for each test. In this regard, it may be observed that conductors 2 to 6 associated with switch SW1, and in group 350, each extend individually to the access links, while the remaining conductors of group 350 are connected in multiple thereto as is indicated in FIG. 1.

Resistors 324 and 325 shown in switch SW2 have a counterpart in each of the switches SW2 to SW5. The purpose of these resistors is to test the adjustment of relays such as 0 to 8 of CR2 by reducing the operate current therethrough. The value of these resistors is such that any register relays will operate therethrough from a current supply of normal voltage only if the relay has a sensitivity of adjustment which will permit it to operate promptly in its normal path, which does not include such a resistor.

If chain contact 24 of relay 220 of any translator develops a fault which prevents its closure, chain-supervisory relay 313 restores. Its contacts 3 disconnect the associated conductor CH–END; its contacts 1 light the associated chain-supervisory lamp; and its contacts 2 extend battery through lamp 310 to major-alarm conductor MA–AL, causing lamp 310 to light and apparatus 380 to sound a major alarm. When the fault is rectified, relay 313 reoperates to terminate the alarm condition. Its contacts 3 reconnect CH–END of the associated chain.

While I have described above the principles of my invention in connection with specific apparatus, it is to be clearly understood that this description is made only by way of example and not as a limitation to the scope of my invention.

I claim:

1. A fault indicator for use with a translator of a register and translator system, wherein a group of registers is provided along with a translator for the common use of said registers, with means for temporarily associating the translator, if idle, individually with any said register which contains a digit combination requiring translation, wherein the translator includes in-marking apparatus operable to store the said digit combination contained within the temporarily associated register, with the translator further including out-marking apparatus operable to store a translated equivalent of the said digit combination stored by the in-marking apparatus and for then imparting said stored translated equivalent to the individualized register, and wherein the translator further includes control means operable under the joint control of the in-marking apparatus and of the out-marking apparatus to terminate the said association to free the translator for further use, failure means operable upon the failure of said control means to terminate said individual association within a predetermined interval from completion of said individual association to indicate said failure, fault-indicator associating means operable by the failure means for temporarily associating said fault indicator individually with said translator, the fault indicator comprising a first and a second recording part, means responsive to operation of the last said associating means for operating said first part and said second part to record respectively the setting of said in-marking apparatus and the setting of said out-marking apparatus of the translator.

2. A fault indicator for use in a system according to claim 1, wherein combined conductors are extended between the said translator and any said register temporarily associated individually therewith, wherein the register first sends in-marking signals over the combined conductors to set the said in-marking apparatus of the translator to record the said digit combination stored in the register, and thereafter withdraws said in-marking signals from the combined conductors, wherein said out-marking means in the translator thereafter sends out-making signals over said combined conductors to the temporarily associated register to impart the said translated equivalent of said digit combination thereto, the said means for operating the said second recording part of the said fault indicator comprising means of operating that recording part to record the ones of said in-marking and out-marking signals which are present on said combined conductors when a said failure occurs, the fault indicator including a third recording part, and means for controlling said third recording part to display whether the signals recorded on said second recording part are said in-marking signals or are said out-marking signals.

3. In a fault indicator for use in a system according to claim 2, the said translator being one of a plurality of similar translators for the common use of the said registers, each translator including the said means for associating that translator individually with said register, the said fault-indicator associating means being operable to associate the fault indicator individually with any said translator at which the said failure means operates, and means for displaying the identification of the one of said translators with which the fault indicator is individually associated.

4. In a fault indicator for use in a system according to claim 1, the said translator being one of a plurality of similar translators for the common use of the said registers, each translator including the said means for associating that translator individually with a said register, the said fault-indicator associating means being operable to associate the fault indicator individually with any said translator at which the said failure means operates, and means for displaying the identification of the one of said translators with which the fault indicator is individually associated.

5. In a fault indicator for use in a system according to claim 1, further means responsive to the said fault-indicator association with a said translator for causing the said register with which said translator is then temporarily associated to be identified and locked out of service, while permitting said translator to be thereupon freed for use with the other said registers.

6. In a fault indicator for use in a system according to claim 5, further means responsive to the said fault-indicator association with a said translator for controlling the said locked-out register to hold within itself the digit combination which was contained therein when the register was identified locked out.

7. In a fault indicator for use in a system according to claim 5, still further means in the said fault indicator responsive to the said fault-indicator association with a said translator for locking within the fault indicator the said setting indications received from the said translator, for terminating the said fault-indicator association, and for withdrawing the fault indicator from further translator association subject to release by an attendant, and means controllable by said fault indicator withdrawal for causing any further translator-failure indications to result in freeing both the affected register and the affected translator for further use despite the indicated translator failure.

8. In a fault indicator for use in a system according to claim 7, means responsive to any said translator-failure indication while said fault-indicator withdrawal exists for signalling an urgent translator-alarm condition.

9. In a system including a fault indicator according to claim 1, test apparatus including means for storing a digit combination to be translated, start means for causing the said associating means to associate the said translator temporarily and individually with the test apparatus, causing the translator to receive and translate the digit combination stored in the test apparatus, and means controlled from the test apparatus for preventing the said control means of the translator from operating to terminate the said association to free the translator, the said fault indicator being responsively operated to record the test setting of the said in-marking apparatus and to record the said translated equivalent setting of the out-marking apparatus.

10. In a system according to claim 9, the said start means comprising a start relay operable to initiate the said temporary association of said translator and said test apparatus, means controlled from the translator coincidental with the said operation of the said fault indicator for restoring the start relay, and means responsive to said start-relay restoration for terminating said temporary association of translator and test apparatus, whereby the translator is quickly freed for further use.

References Cited in the file of this patent

UNITED STATES PATENTS

| | | |
|---|---|---|
| 1,745,039 | Simpson | Jan. 28, 1930 |
| 2,039,001 | Hurst et al. | Apr. 28, 1936 |
| 2,225,688 | Dehn | Dec. 24, 1940 |
| 2,358,267 | Els | Sept. 12, 1944 |
| 2,585,023 | Lewis | Feb. 12, 1952 |